(12) United States Patent
Eibling et al.

(10) Patent No.: US 6,842,492 B1
(45) Date of Patent: Jan. 11, 2005

(54) METHOD AND APPARATUS FOR PEAK-TO-AVERAGE SIGNAL REDUCTION FOR RADIO FREQUENCY TRANSMITTERS

(75) Inventors: Edward Ellis Eibling, Convent Station, NJ (US); Rulon G. Van Dyke, Parsippany, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/507,270

(22) Filed: Feb. 18, 2000

(51) Int. Cl.⁷ .............................................. H04L 27/20
(52) U.S. Cl. ...................................... 375/295; 375/297
(58) Field of Search ................................. 375/146, 295, 375/296, 297, 302, 308; 330/149; 455/39, 91, 127, 422, 522; 370/320, 335, 342, 441

(56) References Cited

U.S. PATENT DOCUMENTS

| | | | | |
|---|---|---|---|---|
| 5,623,513 A | * | 4/1997 | Chow et al. | 375/296 |
| 6,504,862 B1 | * | 1/2003 | Yang | 375/146 |
| 6,535,564 B1 | * | 3/2003 | Mandyam | 375/353 |

* cited by examiner

Primary Examiner—Betsy L. Deppe

(57) ABSTRACT

Presented is a method for reducing the peak to average ratio where the signal is multiplied prior to digital to analog conversion and subsequently subject to the full scale of a digital to analog converter, disproportionably amplifying the average signal more than peak signals, reducing the ratio of the peak signal to the average signal.

19 Claims, 2 Drawing Sheets

| Bit values | Corresponding Value Without Digital Gain | Corresponding Increment Size |
|---|---|---|
| 000 | 0 | 0 |
| 001 | 1 | 1 |
| 010 | 2 | 1 |
| 011 | 3 | 1 |
| 100 | 4 | 1 |
| 101 | 5 | 1 |
| 110 | 6 | 1 |
| 111 | 7 | 1 |

FIG. 2A

| Bit values | Corresponding Value Where Peak is 5 and Digital Gain is Applied | Corresponding Increment Size |
|---|---|---|
| 000 | 0 | 0 |
| 001 | .71 | .714 |
| 010 | 1.43 | .714 |
| 011 | 2.14 | .714 |
| 100 | 2.86 | .714 |
| 101 | 3.57 | .714 |
| 110 | 4.29 | .714 |
| 111 | 5.0 | .714 |

FIG. 2B

METHOD AND APPARATUS FOR PEAK-TO-AVERAGE SIGNAL REDUCTION FOR RADIO FREQUENCY TRANSMITTERS

FIELD OF THE INVENTION

The present invention relates generally to radio frequency signal transmission and the necessary amplification of the signal prior to transmission. Specifically, the present invention relates to reducing the peak to average ratio of the voltage level of a signal.

BACKGROUND OF THE INVENTION

In Code Division Multiple Access ("CDMA") wireless communication, one carrier frequency bandwidth is used for many mobile stations. Mobile stations are able to distinguish their calls from those intended for other stations because the various channels are code spaced. In other words the signals are coded to be orthogonal to each other. Each mobile station attempts to align its receiver with their signal. Thus, only the receiver properly aligned with the unique, user-specific code will receive the call intended for its station. The other calls will appear as noise to that station.

In order for a mobile station to detect a call intended for it, the mobile station must be able to distinguish the channel carrying the call from noise. This requires the transmitted signal power of its call to be at, or above, some power level. Traditionally, radio frequency ("RF") amplifiers are used in a CDMA base station to boost the radio signal so that it arrives at the mobile station at a power level 10 to 15 dB below the noise floor. The coding gain in the mobile station receiver brings the signal to a recognizable level.

The radio and RF amplifier of a base station must be designed with a certain amount of headroom above the maximum average voltage level to handle signal peaks above the maximum average level. More specifically, headroom is the linear amplification range defined by the top of the linear range of the signal, divided by the average of the full power signal expressed in dB units. Typically, in a base station, radios are designed with 11 to 13 dB of headroom and RF amplifiers are designed with 7 to 9 dB of headroom.

The amount of headroom required by the radio and RF amplifier effects the cost and efficiency of the base station. It dictates the size of the RF amplifier which in turn impacts the size of the power supplies, the required cooling capacity, cabinet size and weight and noise. By reducing the headroom of the radio and RF amplifier the operational costs of the base station can be reduced proportionally. Historically, the required headroom for the radio and RE amplifier is constrained by controlling the peak to average ratio of the signal. Conventionally this is accomplished in a peak to root mean square ("rms") reducer, which can implement one of a variety of methods to constrain the peak signal values.

One known method of reducing peak-to average ratios is to hard limit signal peaks. In other words, all peak values exceeding a specified limit are set to the value of that limit. A second approach is to simply eliminate the peak energy from the baseband signal whenever the peak exceeds the specified limit. Yet a third approach is to add an inverse sinc function to lower the amplitude of a peak signal to a level below the constraining limit. Similar to the third approach, a fourth method to reduce the peak to average ratio multiplies a scaling function to all peak signals above the constraining limit. The scaling function is selected so as to lower the peak signals below the constraining limit.

All of the above-mentioned methods focus on reducing the peak values while leaving the average signal values virtually untouched. While these methods are known and used in the art, those skilled in the art continue to seek new methods to further reduce the amount of headroom required by the radio and RF amplifier so as to improve efficiency. Furthermore, none of the prior art methods address the efficient use of the digital to analog converter ("DAC") that precedes the radio and RF amplifier. As peak signals are reduced DACs are being underutilized.

SUMMARY OF THE INVENTION

The present invention represents a novel approach to reducing the peak-to-average ratio. The entire signal is multiplied prior to digital to analog conversion and then constrained to the full scale of the digital to analog converter ("DAC"). As a result, the average signal receives the full digital amplification but the peak signals cannot exceed the full-scale range of the DACs. Thus the average signal is amplified disproportionately greater than the peak signals. As a result the ratio of the peak signal to the average signal is reduced.

To digitally amplify the signal while constraining the peak values to the full-scale range of the DAC, which receives x bits, the scaling factor used to digitally amplify the signal is approximately. $(2^x-1)$/peak voltage. More specifically and accounting for the fact that the AC signal is centered on the DAC range, the scaling factor is more precisely reduced to $(2^{x-1}-1)$/peak voltage. This factor can be preset in the DAC or it may be dynamically selected with a periodic determination of the peak power of the signal, as further described below.

Adding digital gain to the signal in accordance with the present invention effectively multiplies the average signal, while constraining the peak signals. As a result the ratio of the two values is reduced. This approach to peak to average signal reduction has many advantages. First, further reduction in radio and RF amplifier headroom is achieved than is possible with prior art methods discussed above. Furthermore, by constraining the peaks using the full scale capabilities of the DAC, the DAC is more efficiently utilized. In addition, this method minimizes the quantization noise introduced by the digital to analog conversion.

Other advantages that are realized by adding digital gain to the signal before the DAC in accordance with the present invention include the reduced need for analog amplification. Reducing analog amplification also reduces the amount of non-linearities and noise that are amplified with the signal. In addition, a reduction in the analog path gain can also reduce the out-of-band spectral growth within the radio. This extra margin can also be used to reduce the size and cost of the RF amplifiers.

BRIEF DESCRIPTION OF THE DRAWINGS

FIG. 2A illustrates the resolution realized with a standard binary representation of signal voltage.

FIG. 2B illustrates the increased resolution realized with a binary representation of a signal voltage after digital gain in accordance with the present invention has been applied.

DETAILED DESCRIPTION OF THE INVENTION

Figure 1:
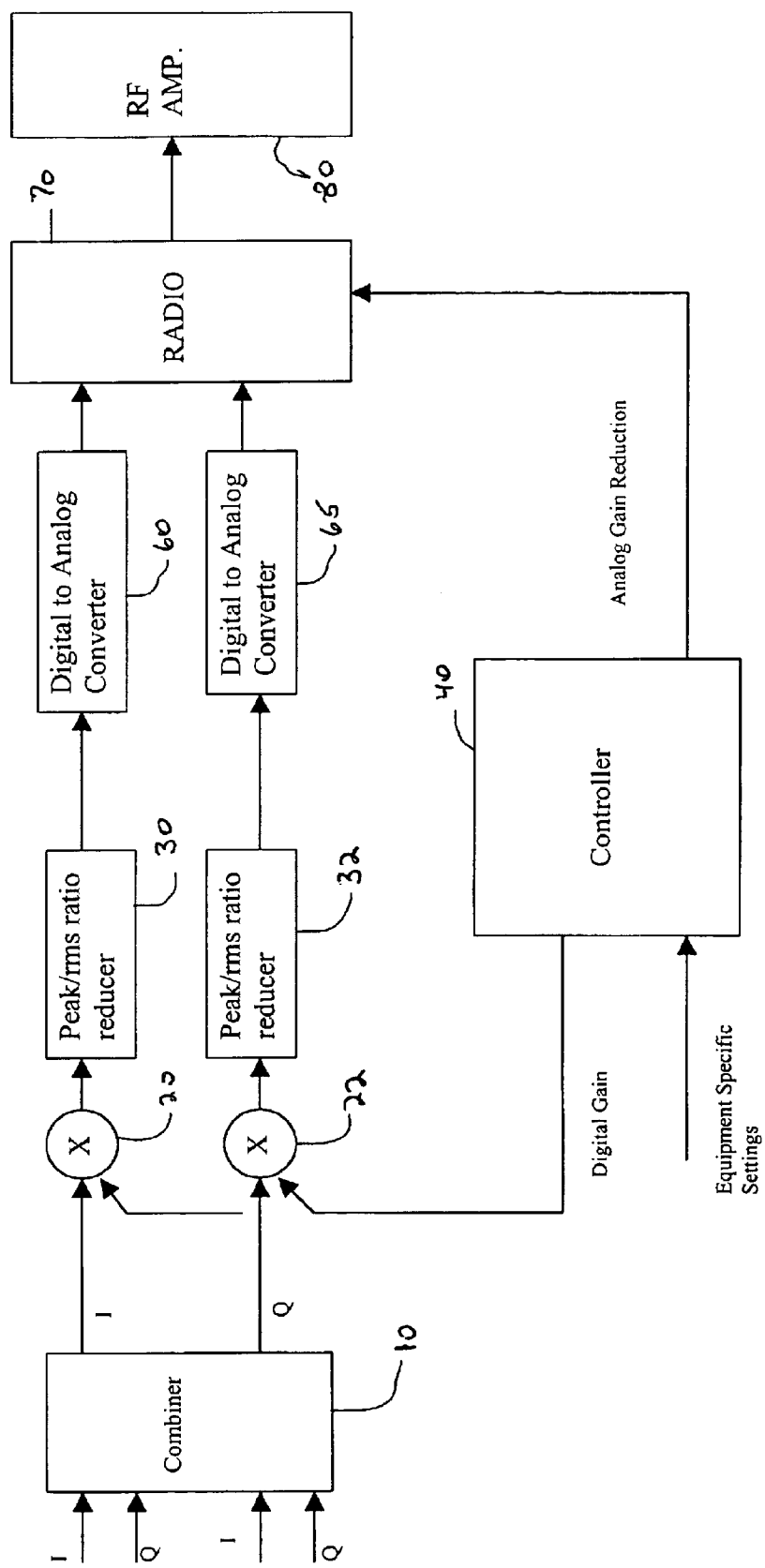
FIG. 1 is a schematic of the digital front end of a base station RF transmitter.

Referring to FIG. 1 the digital front end of an RF transmitter is shown. Since each transmitter transmits multiple calls on a single frequency band, Combiner 10 combines the I and Q components of all of the calls into a single signal having one I component and one Q component. Each of the components then travel through separate multipliers 20 and 22, respectively which, as described below, scale the signal to provide the digital gain. The peak/rms ratio reducers 30 and 32 reduce the peak values for each of the signal components to the full-scale range of DACs 60 and 65, as explained in more detail below. The result is that the average signal is amplified while the peaks are constrained at the top end of the DACs.

In one preferred embodiment of the present invention, Combiner 10, multipliers 20 and 22 and Peak/rms ratio reducers 30 and 32 may be implemented in the same field programmable gate array (FPGA). Alternatively, the aforementioned components may be implemented in an application specific integrated circuit ("ASIC"). Yet another alternative implementation would incorporate the multipliers as part of the Peak/rms ratio reducers by including a multiply function as part of the Peak/rms ratio reducer algorithm. In this last alternative, the digital gain from the Controller 40 would be input to the multiplying Peak/rms ratio reducers.

Controller 40 dictates the digital gain factor used by multipliers 20 and 22. Controller 40 is preferably software implemented. In one preferred embodiment of the present invention the Controller 40 is implement in an upstream computer that has knowledge of the required equipment specific parameters. The digital gain and analog gain reduction is downloaded during radio initialization and whenever there is a change in the equipment specific parameters.

As stated above, the digital gain which Controller 40 provides multipliers 20 and 22 and the analog gain reduction provided to radio 70 are based on knowledge of the components used in the transmitter station, shown by the input line for equipment specific settings. These include the type (s) of channel elements ("CE") and their corresponding signal processing gain that are used in the base station implementing the present invention. A table lookup can be used to get the CE signal processing gain for rms counts/dgu for the specific CE type (dgu=digital gain unit). When two or more types of CE are used, the greatest CE signal processing gain is used. Typically channel elements are designed with a gain in the range of 0.9 to 1.1 rms counts/dgu. One known channel element has gain of 1.0597 rms counts/dgu. A second known channel element has a gain of 1.0478 rms counts/dgu.

Another equipment specific setting which the Controller 40 must consider is the maximum allowed 10-minute average power and the maximum allowed 2-second average power overshoot. Typically, the maximum allowed 10-minute average power is 77760 $dgu^2$ (digital gain units squared), while the maximum allowed 2-second average power overshoot is 1 dB to 3 dB, depending on the specific overload control algorithm used.

The Controller 40 also considers the constraining peak-to-average ratio set-point, which is typically 6 to 9 dB. The radio can be designed to have lower analog gain to take advantage of the present invention. This radio-inherent analog gain savings is taken into account by Controller 40. This value is approximately 9 dB, but may fall between 0 to 12 dB.

As explained in more detail below, the size of the DAC is an important factor for the Controller 40 to consider. DACs have capacities between 10 and 16 bits, with a typical size of 12 bits. Lastly, the Controller 40 may consider the customer set analog gain reduction parameter, which are typically adjustable in increments of 0.1 dB.

The digital gain is selected so that the peak values, constrained as mentioned below, will be represented as the maximum input that can be received by DACs 60 and 65, respectively. To achieve this objective it is necessary to account for losses in power arising in the various components. Those losses can be estimated also using the equipment specific settings and known calculation methods.

Using the equipment specific settings, Controller 40 computes the following. First, Controller 40 calculates the maximum expected I or Q output of Combiner 10. This calculation may be based on the following equation: $c*((10^{y/10})*(x))^{1/2}/2^{1/2}$, where c is a signal processing gain for a channel element (CE), y is a maximum allowed two-second average power overshoot, and x is a maximum allowed ten-minute average power. For example, using typical values, I-max is calculated as equal to (1.0597 rms counts/dgu)*$(10^{3\ dB/10}*77760\ dgu^2)^{0.5}/(2)^{0.5}$. This equals 295 rms counts. Note that for this calculation Controller 40 considers the maximum allowed 10-minute average power (77760 $dgu^2$), the maximum allowed 2-second average power overshoot (3 dB) and the CE signal processing gain (1.0597 rms counts/dgu). The $(2)^{0.5}$ factor converts the total signal into its quadrature components of I and Q. Thus the maximum Q value is set to equal the maximum I value.

Using the maximum I and Q values, Controller 40 calculates the desired digital gain for a particular D/A converter of a particular capacity. This calculation may be based on the following equation: $(2^{b-1}-1)/(c*10^{a/20})$, where b is the bit size capacity of the D/A converter and a is a constraining peak-to-average ratio set point for the base station. For the case of a 12 bit D/A converter, the desired digital gain for each quadrature component is computed as $(2^{(12-1)}-1)/(295*10^{8\ dB/20})$. For this calculation, the controller 40 considers the maximum expected I and Q outputs (295), the constraining peak-to-average ratio set-point (8 dB) and the size of the D/A converter (12 bits). For this example, that number is 2.76. This represents the desired digital gain scaling factor.

Next, Controller 40 computes the closest analog gain reduction setting based on the analog gain savings designed in the specific radio used by the base station, the current analog gain reduction setting of the base station and the desired digital gain computed in the prior step. The calculation may be based on the following equation: $f=-r+d+20*\log_{10}(e)$ rounded off to the nearest allowed analog gain reduction increment, where r is an analog gain reduction designed in a radio component, d is a current analog gain reduction setting and e is a desired digital gain. Using typical values: −9 dB (analog gain savings of radio); 3 dB (current analog gain reduction); and 8.8 dB (the closest allowed analog gain reduction for a desired digital gain scaling factor of 2.76, computed as 20 $\log_{10}$ 2.76 rounded to the nearest tenth), the actual analog gain reduction is −9B+3 dB+8.8 dB=2.8 dB. This 2.8 dB analog gain reduction is sent to radio 70.

Finally, the actual gain is computed by Controller 40 using the closest allowed analog gain reduction of 8.8 dB. Thus the actual digital gain for each of the I and Q components is $10^{8.8\ dB/20}$, which equals 2.75. This 2.75 multiplier is the actual scaling factor sent to each of the multipliers 20 and 22.

Peak to rms ratio reducers 30 and 32 constrain the peaks using any known method, including those described above, to constrain the peaks to the maximum power that the transmitter will tolerate. In accordance with the present invention peak to rms ratio reducers 30 and 32 will constrain the peak signals, which have been digitally amplified, to the full-scale range of DACs 60 and 65. The I and Q components are then separately converted to analog form by DACs 60 and 65, respectively.

In accordance with the present invention digital amplification is realized by inputting the digital signal at the higher end of DACs 60 and 65. In one advantageous embodiment of the present invention, the two DACs may be implemented on a single integrated circuit component.

Keeping the peak value constrained to the maximum power which the transmitter will tolerate and scaling the signal in accordance with the present invention will effectively raise the average power of the signal. Consequently, the peak-to-average ratio of the signal is reduced as compared with the same signal without digital amplification, thus less headroom is needed by radio 70 and RF amplifier 80.

In addition, analog amplifier cost is further reduced since less analog amplification is needed for the digitally amplified signal. This is shown on FIG. 1 and as explained above, analog gain reduction information is sent from Controller 40 to radio 70. This data is inversely proportional to the digital gain boost, but need only be set once. Lastly, with the method of the present invention it is easier for a mobile station to identify its signal transmitted in accordance with the present invention, from the noise because finer distinctions in power level are available.

As stated above, the digital gain is realized by applying a different multiplying factor to multipliers 20 and 22. By multiplying the digital signal input to the DAC by this factor, the digital signal is brought to operate on the higher end of the DAC and the per bit resolution is increased. To further explain the idea of moving the signal to the high end of the DAC, consider a DAC that can receive x bits at its input. Typically, the peak signal will have a value less than the binary value that can be presented by these x bits. In other words, transmitters typically use DACs that can receive an input value greater than the peak signal. Digital gain is introduced by scaling the input signal so that the peak value is represented by all x bits in their "on" state, i.e. the maximum value that can be input to the DAC.

As a second example of the present invention and given the embodiment shown in FIG. 1, we consider a 40 channel CDMA base station. In this example the highest expected CDMA I or Q Peak value will be 1019 counts for a full average power output. This peak value has a probability of occurrence of not more than $1 \times 10^{-4}$. However, a typical 12 bit DAC could theoretically handle peak values up to ($2^{12-1}-1$), or 2047 counts, where one count represents 1/2047 of the DAC full scale output voltage. Since in this example, however a signal will probabilistically not peak above +/−1019 counts, the DAC may be scaled by a factor of 2 (i.e. 2047/(1019). Using this scale all signal values will be increased by a factor of two. Consequently, to the extent the range of values prior to scaling was not 0–4095, after scaling the operating range of the DAC will move up to the more significant bits. Thus 1019 will require the 12th bit.

In one preferred embodiment of the present invention digital gain is computed as ($2^{12-1}-1$)/peak voltage of the signal. In other words, for a 12 bit DAC, a peak value of 1019 is assigned the binary number of 1111,1111,1111, which ordinarily has a value of 2047 ($2^{12-1}-1$). The new scale factor can be determined at algorithm design time, so the maximum output value just fits in the available bits. Alternatively, the gain can be adjusted periodically where it is determined that the maximum peak is below the tolerance limit of the transmitter.

In whatever manner the gain is computed, the effect is to raise the average signal without changing the peak. This digital gain allows the analog gain to be reduced downstream. Lower analog gain downstream restores the expected peak and average input voltage to the RF power amplifier. Accordingly, the higher DAC utilization and lower analog gain increase performance. Furthermore, it should be noted that the scaling is simply an accounting change. The form of the hardware, firmware, or software is not effected by the implementation of the present invention.

As for the greater granularity introduced by the digital gain, consider for example a peak power level of 1023. This can be expressed with ten (10) bits. $2^{10}-1=1023$. With ten (10) bits, the power resolution per step is 1 since there are 1024 combinations of 10 zeros and ones. Thus, one could only distinguish between two signals with a 1 count difference. If, however, a twelve (12) bit digital to analog converter is used to express the same peak power, then the resolution per step is 0.25. This is arrived at by dividing 4095 ($2^{12}-1$) from 1023. In other words one can now distinguish between two signals, or a signal and noise, if there is a difference of 0.25 between them. Accordingly, while prior art systems use analog gain to boost a signal so that it can be detected over noise, this need is reduced with the greater granularity achieved with digital gain.

It should be noted that the choice of a twelve (12) bit DAC in the above example is merely illustrative. Larger DACs may be selected as well, such as a sixteen (16) bit DAC. Indeed, the importance of the present invention increases with larger DACs since additional headroom in the radio and RF amplifier will be required.

To illustrate this further, FIGS. 2A and 2B set forth the eight possible combinations of three bits. As shown in FIG. 2A, the binary values for these three bits range from 0 to 7, with a unit step size. However, when a number, i.e. 5, smaller than the maximum binary value represented by the bits, i.e. 7, is spread over the range of combinations the incremental step size decreased to approximately 0.714.

The calculation of digital gain and analog gain reduction was discussed above in connection with the Controller 40. One can also consider the present invention from the perspective of the savings in analog amplification as follows. Consider a CDMA transmitter using a 12 bit DAC for each of the I and Q paths, as shown in FIG. 1. CDMA transmitters tolerate peak power out of Combiner 10 of 77760 $dgu^2$'s of power. This corresponds to 295 rms, since the root mean square voltage ("rms") is related to dgu by a factor of 1.0597, (($77760)^{1/2}*1.0597$)=295. The typical peak-to-average ratio of a 40 channel CDMA base station using these values is 10.8 dB (20*log (1019/295)). Analog amplifiers, however are constrained by peak-to-average ratios of 8 dB. Anything greater results in signal compression and even saturation and the introduction of non-linear noise and out-of-band spectral growth. By applying digital gain in accordance with the present invention our peak-to-average ratio can be decreased, such that at the radio there is a reduction of as much as 7 dB (from 13 dB to 6 dB) and analog path gain can be reduced as much as 12 dB. Thus not only do we prevent saturation of the analog amplifiers, we do not need as much analog amplification and we also realize finer granularity, as explained above.

Lastly, it should be pointed out that base stations typically requires 11–13 dB of headroom. The same station, however, applying the method of the present invention can reduce the required headroom to 6–9 dB. To illustrate the significant reduction in amplifier size, consider that a 65 Watt amplifier is required to handle an 8 Watt average signal with 9 dB of headroom. By decreasing the headroom to 8 dB, the size of the amplifier may be reduced to 50 Watts.

The foregoing merely illustrates the principles of the present invention. Those skilled in the art will be able to devise various modifications, which although not explicitly described or shown herein, embody the principles of the invention and are thus within its spirit and scope.

What is claimed is:

1. A wireless base station transmitter comprising a digital front end and an analog back end, said digital front end and analog back end connected through at least one digital-to-analog converter having a full scale range, said base station transmitter comprising:

at least one multiplier in the digital stream before said at least one digital-to-analog converter for introducing digital gain to a signal by scaling a digital representation of said signal by a scaling factor determined from a received equipment setting of at least one component of said base station transmitter.

2. The wireless base station transmitter of claim 1, further comprising at least one peak-to-rms ratio reducer before said at least one digital-to-analog converter, for constraining the signal peaks of said signal with digital gain, to a level that does not exceed the maximum power tolerances of said base station transmitter.

3. The wireless base station transmitter of claim 1 wherein the digital representation of the signal to be transmitted comprises I and Q components and said I component is input into a first digital-to-analog converter and said Q component is input into a second digital-to-analog converter, wherein said at least one multiplier comprises:

at least one first multiplier in the digital stream before said first digital-to-analog converter for introducing digital gain to said I component by scaling the digital representation of said I component by a scaling factor determined from a received equipment setting of at least one component of said base station transmitter; and at least one second multiplier in the digital stream before said second digital-to-analog converter for introducing digital gain to said Q component by scaling the digital representation of said Q component to the full scale range of by a scaling factor determined from a received equipment setting of at least one component of said base station transmitter.

4. The wireless base station transmitter of claim 3, further comprising:

at least one first peak-to-rms ratio reducer for constraining the signal peaks of said I component of said signal with said digital gain, to a level that does not exceed the maximum power tolerances of said base station transmitter; and at least one second peak-to-rms ratio reducer for constraining the signal peaks of said Q component of said signal with said digital gain, to a level that does not exceed the maximum power tolerances of said base station transmitter.

5. The wireless base station transmitter of claim 1 wherein said transmitter is a Code Division Multiple Access transmitter.

6. A method for transmitting a radio frequency signal from a base station transmitter comprising a digital end and an analog end, wherein said signal is to be amplified prior to transmission, said method comprising the steps of:

applying a digital gain to the radio frequency signal at said digital end of said base station transmitter, wherein the digital gain scales the signal by a scaling factor determined from a received equipment setting of at least one component of said base station transmitter;

converting said radio frequency signal with said digital gain, into analog form; and transmitting said analog radio frequency signal.

7. The method of claim 6 wherein said radio frequency signal comprises an I component and a Q component and where said step of applying digital gain is separately applied to said I and Q components.

8. The method of claim 6 further comprising the step of constraining said signal with said digital gain such that peak values of said digital gain are limited by the maximum power tolerance of said base station transmitter.

9. The method of claim 8 wherein said radio frequency signal comprises an I component and a Q component and wherein said constraining step is separately applied to said I and Q components.

10. The method of claim 6 wherein said converting step is performed with at least one digital-to-analog converter having x-bit input lines and wherein said step of applying digital gain further comprises the step of multiplying said digital representation of said voltage of said radio frequency signal by a factor equal to $(2^{x-1}-1)/$(the peak voltage value of said frequency signal).

11. A method for computing an analog gain reduction in a base station in which digital gain is applied to a signal to be transmitted, said method comprising the steps of:

receiving specific equipment settings of at least one or more components of said base station;

using at least one of said specific settings, to compute a maximum expected value of said signal;

using said maximum expected value, to compute a desired digital gain (e); and using said computed desired digital gain, to compute a closest analog gain reduction setting (f).

12. The method of claim 11 wherein said signal comprises an I component and a Q component and wherein said step of computing a maximum expected value of said signal further comprises computing a maximum expected value of each of said I and Q components of said signal.

13. The method of claim 12 wherein said specific equipment settings comprise one or more of the following:

a signal processing gain (c) for root mean square counts to digital gain units appropriate for one or more channel elements used by said base station, each of said channel elements to support at least one call;

a maximum allowed ten-minute average power for said signal, (x);

a maximum allowed two-second average power overshoot for said signal, (y);

a constraining peak-to-average ratio set-point for said base station (a);

an analog gain reduction designed in a radio component of said base station (r);

the bit size capacity "b" of one or more digital-to-analog converters of said base station;

an analog gain reduction for adjusting the base station coverage footprint; and an allowed analog-to-gain reduction increment.

14. The method of claim 13 wherein said maximum expected values of said I and Q components are computed as $c*((10^{y/10})*(x))^{1/2}/2^{1/2}$, where y is measured in dB and x is measured in digital gain units squared.

15. The method of claim 13 wherein said desired digital gain for each of said I and Q components are calculated as $(2^{b-1}-1)/(c*10^{a/20})$ where a is measured in dB.

16. The method of claim 15 wherein b equals 12.

17. The method of claim 13 further comprising the step of determining a current analog gain reduction setting of said base station, said current analog gain reduction setting of said base station being designated as (d), wherein said closest analog gain reduction setting is computed as $f=-r+d+20*\log_{10}(e)$ rounded off to the nearest allowed analog gain reduction increment.

18. The method of claim 12 further comprising the step of computing an actual digital gain for each I and Q component of said signal, using said closest analog gain reduction setting.

19. The method of claim 18 wherein said actual digital gain is computed as $10^{f/20}$, where (f) is measured in dB.

* * * * *